(12) United States Patent
Yakovlev

(10) Patent No.: US 7,577,814 B1
(45) Date of Patent: Aug. 18, 2009

(54) FIRMWARE MEMORY MANAGEMENT

(75) Inventor: Sergiy B. Yakovlev, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 390 days.

(21) Appl. No.: 11/618,003

(22) Filed: Dec. 29, 2006

(51) Int. Cl.
*G06F 12/00* (2006.01)

(52) U.S. Cl. .................. 711/170; 711/105; 711/158; 711/165; 713/1; 713/2; 713/100

(58) Field of Classification Search .......... 711/170, 711/105, 158, 165; 713/1, 2, 100
See application file for complete search history.

(56) References Cited

U.S. PATENT DOCUMENTS

| 6,434,695 | B1 * | 8/2002 | Esfahani et al. ............ 713/2 |
| 6,460,122 | B1 * | 10/2002 | Otterness et al. .......... 711/154 |
| 6,691,234 | B1 | 2/2004 | Huff .......................... 713/300 |
| 6,732,265 | B2 * | 5/2004 | Esfahani et al. ............ 713/2 |
| 7,007,159 | B2 * | 2/2006 | Wyatt ........................... 713/1 |
| 7,415,634 | B2 * | 8/2008 | Anderson et al. .......... 714/36 |
| 7,502,803 | B2 * | 3/2009 | Culter et al. ................ 707/101 |
| 2004/0064722 | A1 * | 4/2004 | Neelay et al. .............. 713/200 |
| 2006/0026339 | A1 * | 2/2006 | Rostampour ............... 711/103 |

\* cited by examiner

*Primary Examiner*—Stephen C Elmore
(74) *Attorney, Agent, or Firm*—Hope Baldhuff Hartman, LLC

(57) ABSTRACT

A firmware memory manager allocates memory for code and data based on a lifespan associated with each allocation. The memory manager determines whether each allocated block of memory is needed only for a certain lifespan. Based on this determination, blocks of memory needed beyond the certain lifespan are all allocated adjacent to each other in memory. Once execution exceeds the certain lifespan, memory needed only for boot time is reported as being available for reuse by an operating system.

20 Claims, 6 Drawing Sheets

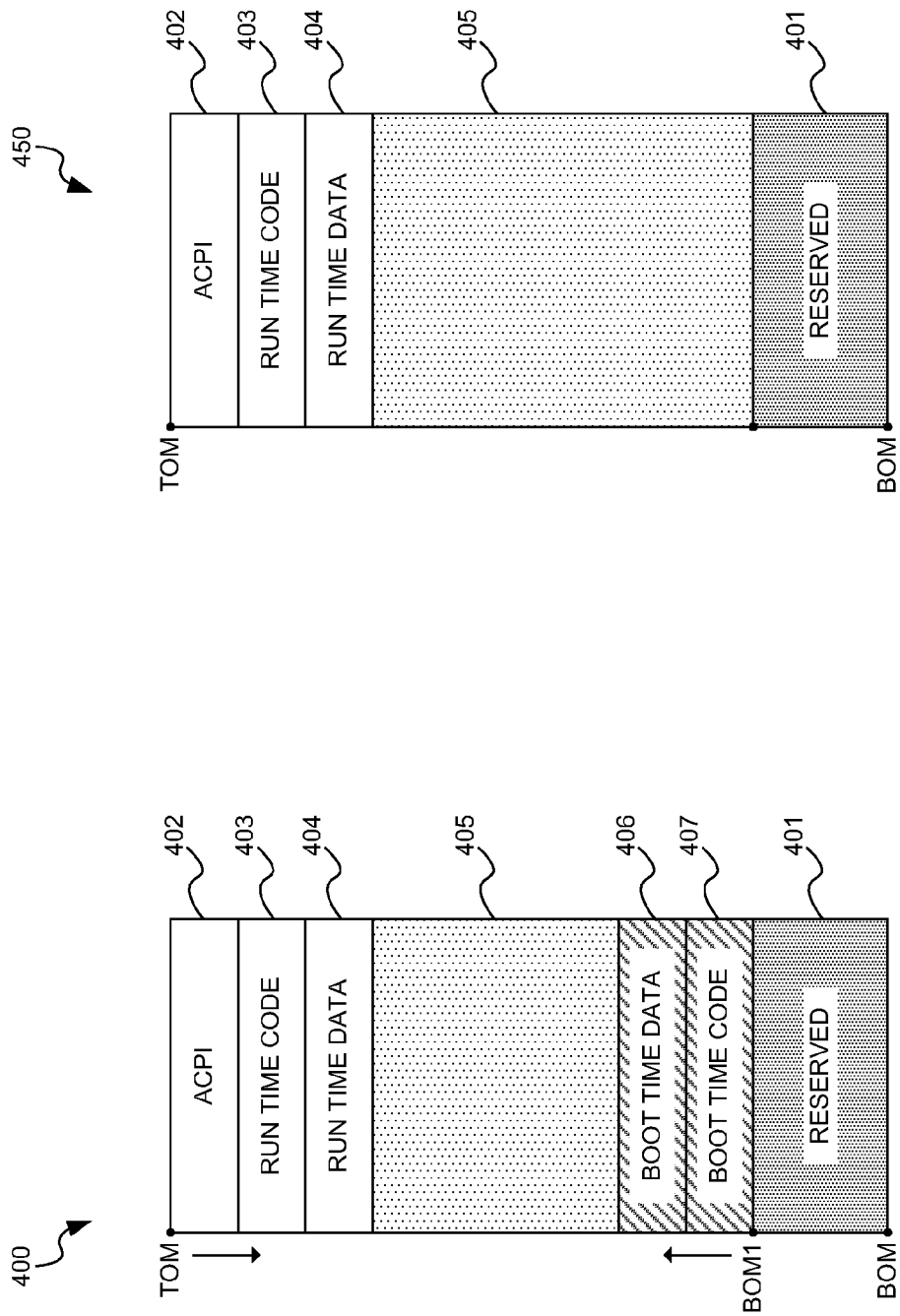

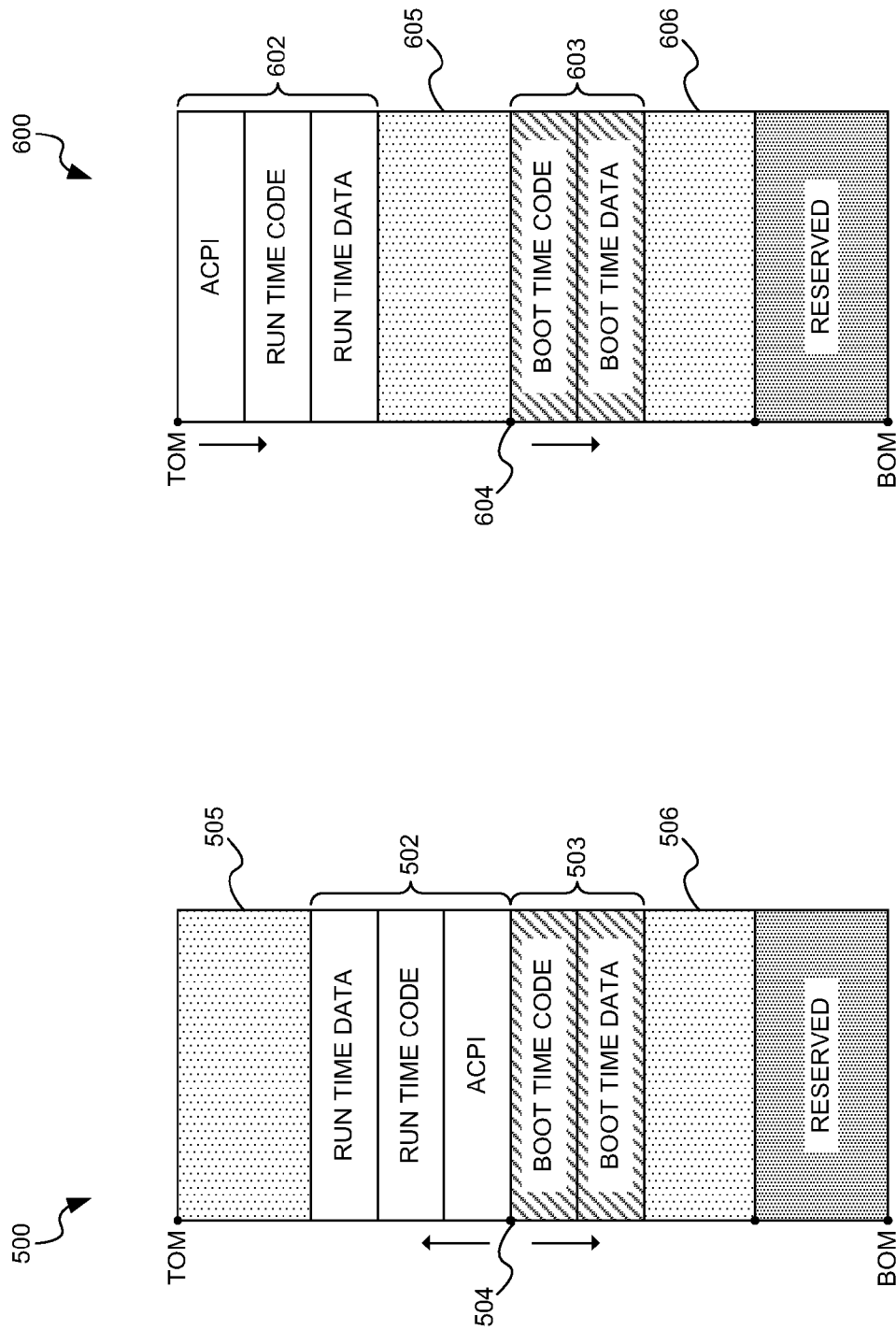

FIRMWARE MEMORY MANAGEMENT

BACKGROUND

Computer systems are known that utilize a firmware program stored in non-volatile memory to assist with the start up of the computer system and to enable communication with low-level hardware. For instance, personal computer systems utilize a basic input/output system (BIOS) or an extensible firmware interface (EFI) firmware that includes program code containing fundamental routines that help transfer information between elements within the computer. One of the main purposes of firmware is to bootstrap the computer system and achieve a basic boot policy that may include, but is not limited to, booting of an operating system. Firmware code may, at startup for example, be responsible for loading various blocks of code and data into the memory of a computer. Code and data may include computer instructions and data for use at the time of startup or waking (boot time) as well as instructions and data which may be accessed by running applications once control has been passed to the operating system (run time).

The strategic loading and placement of code and data into memory may be described as memory management. Existing firmware loads code and data into memory without regard to whether the code or data may only be needed during boot time. Memory is allocated sequentially or utilizing some other basis without regard to the lifespan of the code or data. Subsequently, when memory locations storing code and data needed only at boot time are freed for use by the operating system, the regions of freed memory may not be contiguous, creating gaps interspersed between run time code and data which is still in use. Such non-contiguous regions may be difficult to reuse due to their smaller size.

Moreover, creating multiple non-contiguous regions that are still in use may lead to unnecessary complexity when retrieving a memory map from a firmware. For example, in a personal computer, when the firmware hands control to an operating system during boot, the operating system may make a chain of firmware calls in order to retrieve a collection of memory map entries describing available memory blocks. Each successive firmware call may retrieve information about a different block of memory. Some operating systems may be limited to a maximum number of memory map calls, possibly preventing the retrieval of information about all blocks in memory. As such, creating multiple non-contiguous blocks of run time code and data may cause the number of calls needed to recreate a full memory map to exceed the maximum number.

It is with respect to these considerations and others that embodiments of the present invention have been made.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are methods and systems for efficiently managing firmware memory allocations. A request for a memory allocation is received, and a determination is made as to whether the lifespan of the requested memory exceeds a certain limit. When the lifespan of the requested memory falls within the limit, the memory is allocated in a portion of memory storing only allocations having a similar lifespan. The lifespan limit may constitute a transition between boot time and run time.

Provided are computer-readable media storing computer-executable instructions. The instructions are operative to receive a memory allocation request for a block of memory. A determination that the lifespan of the block of memory does not exceed a certain limit is made. The block of memory is allocated adjacent to another block of memory already allocated and having a similar lifespan.

Other apparatuses, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

BRIEF DESCRIPTION OF THE DRAWINGS

FIGS. 4A, 4B, 5 and 6 are memory maps depicting the locations of code and data in memory according to embodiments.

DETAILED DESCRIPTION

Figure 1:
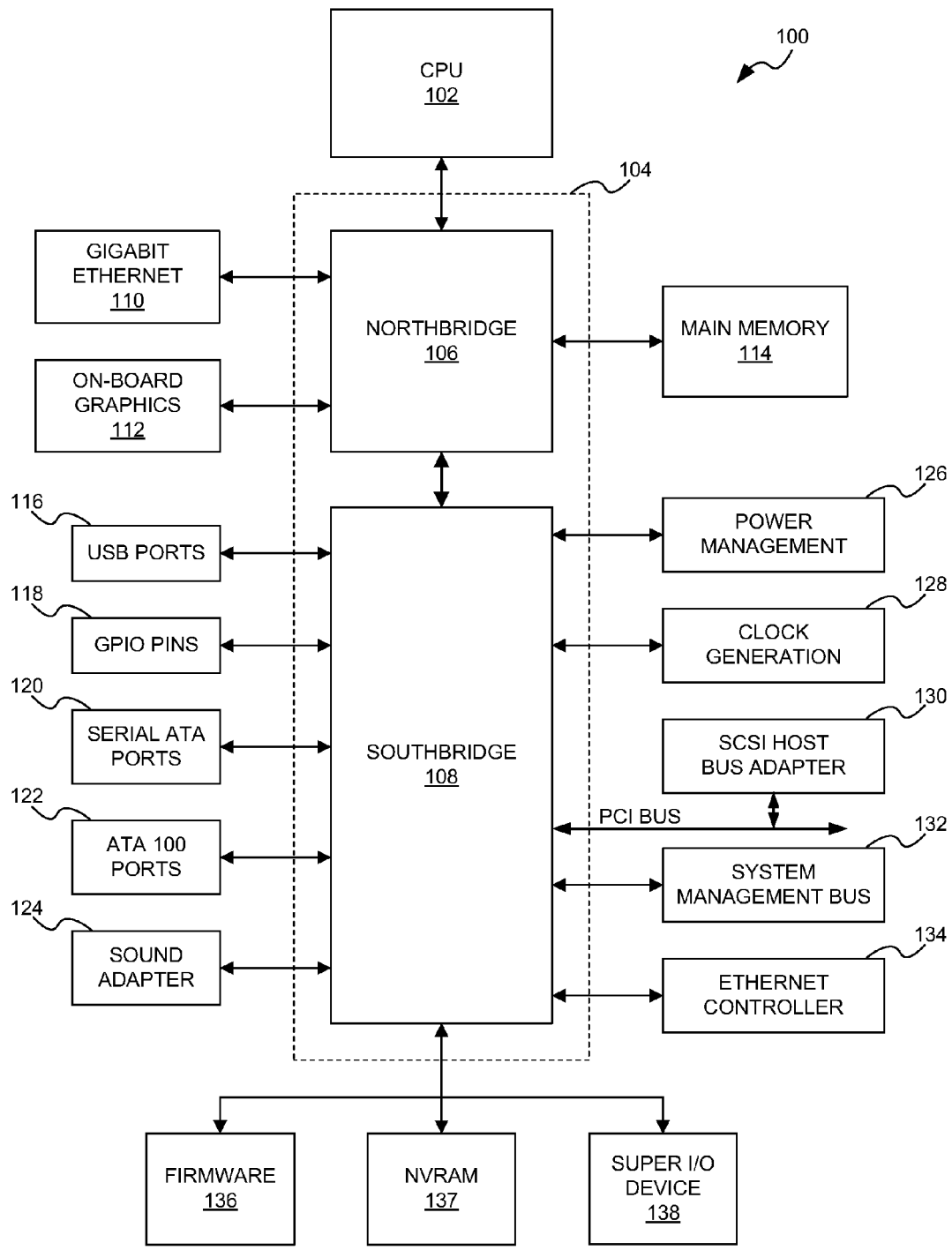
FIG. 1 is a computer architecture diagram that illustrates various components of a computer that provides an illustrative operating environment according to embodiments.

The following detailed description is directed to apparatuses and methods for efficient firmware memory management. In the following detailed description, references are made to the accompanying drawings that form a part hereof, and which are shown, by way of illustration, using specific embodiments or examples. Referring now to the drawings, in which like numerals represent like elements through the several figures, aspects of the various implementations and an illustrative operating environment provided herein will be described.

FIG. 1 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments presented herein will be described. It should be appreciated that although the embodiments described herein are discussed in the context of a conventional desktop or server computer, any type of computing device may be utilized. FIG. 1 shows an illustrative computer architecture for a computer 100 that is operative to efficiently manage firmware memory. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 is a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

A chipset 104 includes a northbridge 106 and a southbridge 108. The northbridge 106 provides an interface between the CPU 102 and the remainder of computer 100. The northbridge 106 also provides an interface to a random access memory (RAM) used as a main memory 114 in the computer 100 and, possibly, to an on-board graphics adapter 112. The northbridge 106 may also include functionality for providing networking functionality through a gigabit Ethernet adapter 110. The gigabit Ethernet adapter 110 is capable of connecting the computer 100 to one or more other computers via a network. Connections which may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot system compliant SCSI host bus adapter 130. In one embodiment, the bus comprises a peripheral component interconnect (PCI) bus. The southbridge 108 may also provide a system management bus 132 for use in managing the various components of computer 100. Power management circuitry 126 and clock generation circuitry 128 may also be utilized during operation of the southbridge 108.

The southbridge 108 is also operative to provide one or more interfaces for connecting mass storage devices to the computer 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs and other data. As known to those skilled in the art, an operating system comprises a set of programs that control operations of a computer and allocation of resources. An application program is software that runs on top of the operating system software, or other run time environment, and uses computer resources to perform application specific tasks desired by a user of the computer 100.

The mass storage devices connected to the southbridge 108 and the SCSI host bus adapter 130, and their associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM or a non-volatile random access memory (NVRAM) 137 such as a flash memory. The computer storage medium may be used for storing the firmware 136 that includes modules containing instructions and data that help to start up the computer 100 and to transfer information between elements within the computer 100. The firmware 136 may include a firmware that is compatible with the Extensible Firmware Interface (EFI) specification. It should be appreciated that in addition to the firmware 136 including an EFI-compatible firmware, other types and combinations of firmware may be included. For instance, the firmware 136 may comprise a Basic Input and Output System (BIOS) firmware or other type of firmware known to those in the art. Additional details regarding the operation of the EFI firmware 136 are provided below with respect to FIGS. 2 and 3.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
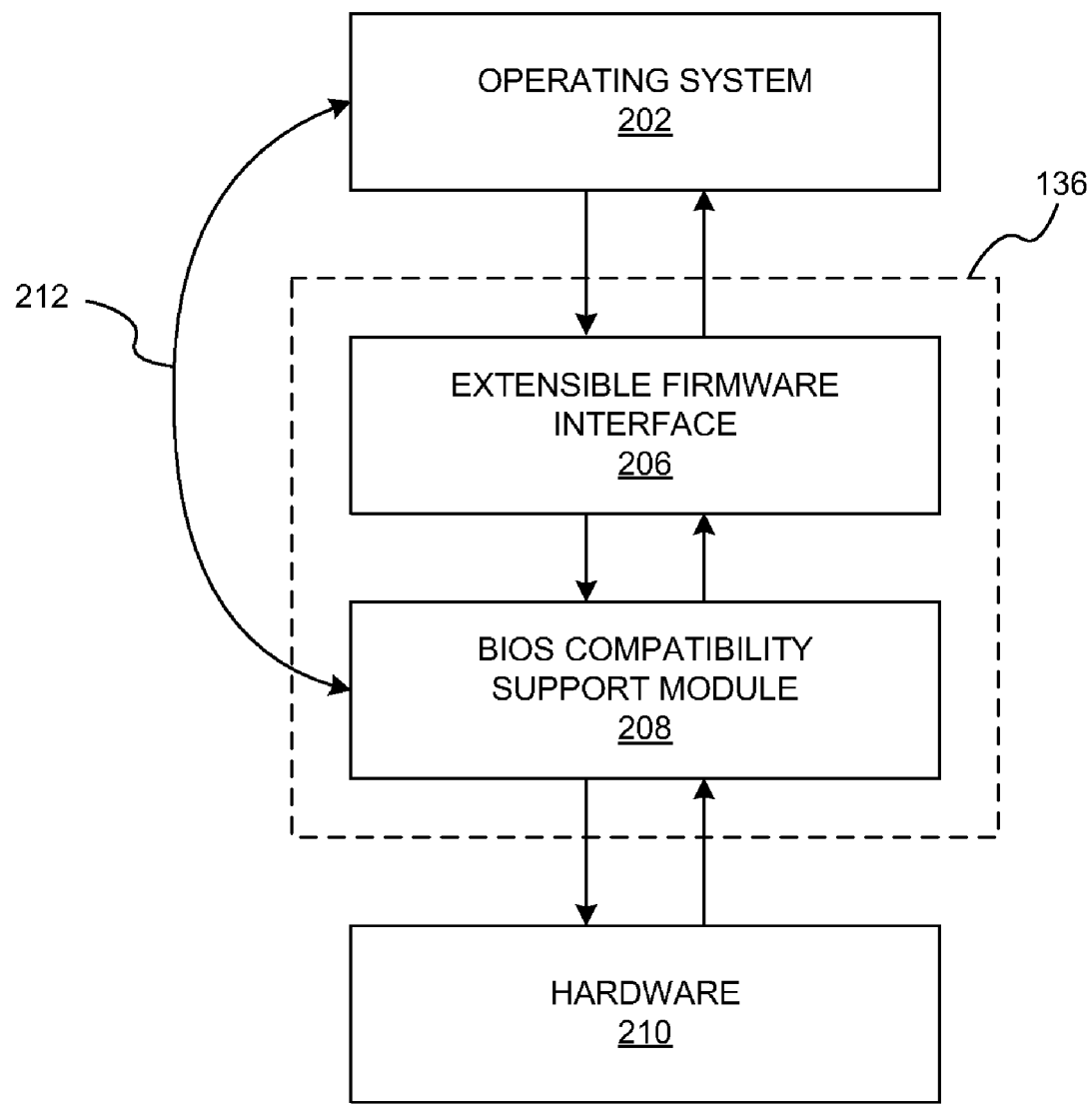
FIGS. 2 and 3 are computer architecture diagrams that illustrate aspects of an Extensible Firmware Interface (EFI) environment that may be utilized according to embodiments.

Referring now to FIG. 2, additional details regarding the operation of the EFI firmware 136 of the computer 100 will be described. In most computing systems, low-level instruction code is used as an intermediary between the hardware components of the computing system and the operating software and other high-level software executing on the computing system. In some computer systems, this low-level instruction code is BIOS. BIOS provides a set of software routines that, among other things, allows higher-level software to interact with the hardware 210 of the computing system using standard calls.

Because of limitations of the BIOS in many computers, a new specification for creating the firmware that is responsible for booting the computer and for intermediating the communication between the operating system and the hardware has been created. The specification is called the Extensible Firmware Interface (EFI) specification, which was originally created by INTEL CORPORATION and which has been extended by the UNIFIED EXTENSIBLE FIRMWARE INTERFACE FORUM (UEFI).

The EFI specification describes an interface 206 between the operating system 202 and the firmware 136. In particular, the specification defines the interface that platform firmware must implement and the interface that the operating system may use in booting and accessing hardware. How the firmware 136 implements the interface 206 is left up to the manufacturer of the firmware. The EFI specification provides interfaces for EFI drivers to communicate with each other, and the EFI core provides functions such as allocation of memory, creating events, setting the clock, and many others.

As described above, firmware 136 may include a firmware compatible with the EFI specification from INTEL CORPORATION or from the UEFI FORUM. The specification defines a pre-boot environment as well as ways for the operating system 202 and the firmware 136 to communicate only information necessary to support the operating system boot process. This may be accomplished through a formal and complete abstract specification of the software-visible interface presented to the operating system 202 by the platform and the firmware.

According to one implementation of EFI, both the EFI 206 and a BIOS compatibility support module (CSM) 208 may be present in the firmware 136. This allows for a heterogeneous environment of operating systems and device drivers which may only support either EFI or BIOS interfaces. An interface 212 may be provided to permit BIOS function calls made by legacy operating systems and applications. Additional details regarding the architecture and operation of the EFI 206 are provided below with respect to FIG. 3. Moreover, additional details regarding the operation and architecture of the EFI 206 can be found in either version 1.10 of the EFI specification available from INTEL CORPORATION and/or version 2.0 of the UEFI specification available from the UEFI FORUM, both of which are expressly incorporated herein by reference.

Figure 3:
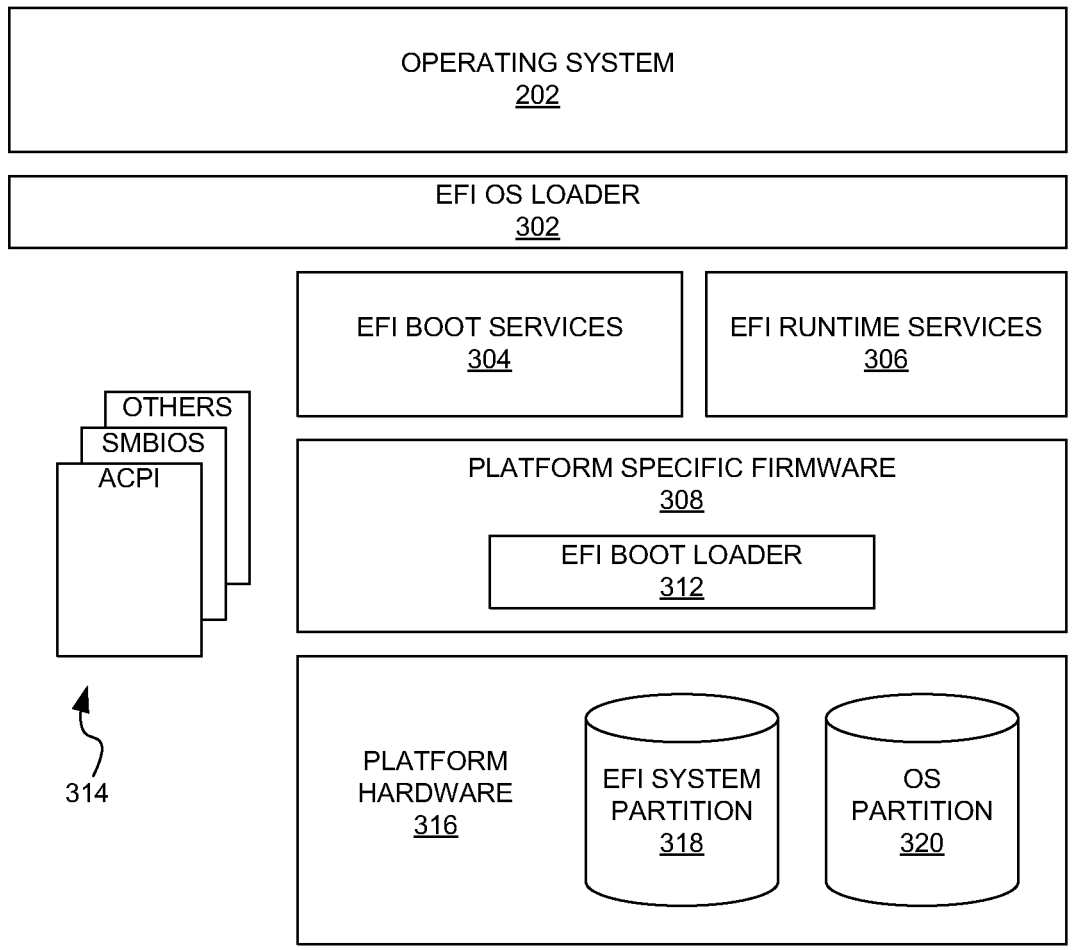

Turning now to FIG. 3, additional details regarding an EFI specification-compliant system which may be utilized to provide an operating environment for the various implementations presented herein will be described. As shown in FIG. 3, the system includes a platform hardware 316 and an operating system (OS) 202. A platform firmware 308 may retrieve an OS image from the EFI system partition 318 using an EFI OS loader 302. The EFI system partition 318 may be an architecturally shareable system partition. As such, the EFI system partition 318 defines a partition and file system that are designed to allow safe sharing of mass storage between multiple vendors. An OS partition 320 may also be utilized.

Once started, the EFI OS loader 302 continues to boot the complete operating system 202. In doing so, the EFI OS loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface (ACPI) and the System Management BIOS (SMBIOS) specifications may be supported.

EFI boot services 304 provide interfaces for devices and system functionality that can be used during boot time. EFI run time services 306 are available to the OS loader 302 during the boot phase and to an operating system when it is running. For example, run time services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined run time and boot services.

Various program modules provide the boot and run time services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order. It should be appreciated that both the operating system 202 and the firmware 136 provide a run time environment for application programs as described herein.

In loading code and data into memory at boot time, the EFI firmware 136 utilizes code which may best be described as a memory manager. The memory manager serves as a gatekeeper to the memory, ensuring that modules and applications do not overwrite each other. When code requires additional memory for storage of code and/or data, it may request an allocation via the memory manager. For example, when the EFI boot loader 312 loads a module into memory, it will request an allocation from the memory manager and receive a memory address or pointer to the location allocated.

FIG. 4A is a memory map 400 depicting the locations of various code and data at boot time in a memory according to one or more embodiments. The memory represented by memory map 400 may constitute all or a portion of main memory 114. Memory map 400 is not intended to be to scale and is intended to show the location of code and data relative to each other. At the bottom of memory map 400, bottom of memory (BOM) represents a lower memory address, and constitutes memory address 0 in many embodiments. At the top of memory map 400, top of memory (TOM) represents a higher memory address, and may constitute, for example, memory address 128M at the top of main memory consisting of 128 megabytes (MB) of addressable storage. A reserved portion 401 of memory may be reserved for compatibility with legacy systems, shown here at the bottom of the memory. The reserved portion 401 may be reserved for use by the BIOS compatibility support module 208. The reserved portion 401 may amount to 1 MB of space in some embodiments. The remaining portion of memory may be used by the EFI firmware 136 for locating code and data, as shown in FIG. 4A.

As noted above, a memory manager allocates memory for loading the various blocks of code and data. The memory manager determines whether each block is needed only for within a particular lifespan limit, or may be needed beyond that time, determining in some embodiments whether the allocated block is needed only for boot time or for run time. The memory manager may make this determination based on parameters set by the code making the allocation request, such as a memory type parameter. Likewise, the determination may be made based on a passed-in value of the allocation request itself. For example, one or more ACPI modules 402 may be allocated by the memory manager, including an ACPI NVS module, and an ACPI Reclaimable module. Some ACPI modules 402 have a lifespan extending beyond boot time, so they will be allocated as blocks of memory in the vicinity other non-boot-only blocks.

When allocating memory for ACPI modules 402, the memory manager determines a location to begin locating non-boot-only blocks. In the embodiment of FIG. 4A, non-boot-only blocks are allocated starting from the top of memory (TOM) point. As such, the size of ACPI modules 402 may be subtracted from the TOM address to determine a starting address for the ACPI modules 402. Should executing ACPI module code subsequently require an additional memory allocation, the memory manager will note the non-boot-only status of the request, either based on the lifespan of the calling code, or based on a parameter of the request.

The memory manager performs a similar determination and allocation of subsequent memory requests. For example, the next code or data to be allocated to memory may be the boot time code 407, which may include functions required only during boot time. The lifespan of the boot time code 407 is determined to be boot-only, and is allocated in a memory location separate from the non-boot-only blocks. In the embodiment of FIG. 4A, the boot time code 407 is allocated to a memory address BOM1 adjacent to the reserved portion 401. When a third block is set to be allocated, a similar process occurs. For example, if space for the run time code 403 was the next request, the block would be determined to be not-boot-only, and would be allocated adjacent to other non-boot-only blocks, i.e. the ACPI modules 402. In this fashion, the run time data 404 and the boot time data 406 may also be allocated, leaving an unallocated portion 405. Additional blocks would follow a similar pattern of determining a lifespan for each, and then allocating the block to a location common to other blocks with a similar life span. It should be noted that although the boot time data 406 is shown adjacent to the boot time code 407, these boot-only blocks do not necessarily need to be adjacent, so long as their allocation does not prevent the non-boot-only blocks 402, 403, 404 from all being adjacent to each other.

Once the initial blocks shown are allocated by the memory manager, the boot process continues. Additional requests for memory allocations are processed, each time using a lifespan associated with the memory to allocate the memory in the vicinity of other blocks of memory with a similar lifespan. When the EFI boot services 304 complete, the memory allocated to the boot-only blocks (e.g., the boot time code 407 and the boot time data 406) becomes available for use by the operating system 202. Since the boot-only blocks 406, 407 are no longer needed, the operating system 202 is free to utilize the memory. If a call or series of calls is made by the operating system 202 to determine memory left available, the memory occupied by the boot-only blocks 406, 407 will show as being available. For example, if a series of memory map calls is made, the memory allocation entries returned will show the memory occupied by the boot-only blocks 406, 407 as being available. These same memory allocation entries will show that memory allocated to the non-boot-only blocks 402, 403, 404 is not available for use by the operating system 202. This is demonstrated in the example of FIG. 4B.

FIG. 4B is a memory map 450 depicting the locations of firmware code and data at run time in a memory according to one or more embodiments. Here, the memory map displays the available memory once boot time has completed. The memory previously part of the boot-only blocks 406, 407 is now part of the unallocated portion 405. The memory allocation entries will show that the unallocated portion 405 is available to operating system 202 and that it includes the memory previously part of the boot-only blocks 406, 407. The memory allocation entries will also show that the memory allocated to the non-boot-only blocks 402, 403, 404 is unavailable. This showing of unavailability may be handled in some cases by a single memory allocation entry for the block encompassing all of the non-boot-only blocks 402, 403, 404. For example, although ACPI-related blocks may need to be individually reported, other contiguous non-boot-only blocks may be reported together as a single memory allocation entry.

FIGS. 5 and 6 are memory maps 500, 600 depicting alternative memory allocations according to one or more embodiments. In FIG. 5, memory map 500 shows that allocation for both boot-only and non-boot-only blocks begins at a predefined point 504, and moves out. Non-boot-only blocks 502 are allocated starting at the address of the point 504 and ascending, whereas boot-only blocks 503 are allocated starting at the address of the point 504 and descending. This leaves unallocated portions 505, 506, and the latter unallocated portion 506 will grow at run time when the boot-only blocks 503 are no longer needed.

In FIG. 6, memory map 600 shows that allocations for both boot-only and non-boot-only blocks at two points and descend. Non-boot-only blocks 602 begin at top of memory (TOM) and descend. Boot-only blocks 603 begin at a predefined point 604 and descend. This allocation leaves potentially two unallocated portions 605, 606 at boot time. Both unallocated portions 605, 606 will combine with the memory storing the boot-only blocks 603 to create a larger single unallocated portion at run time when the boot-only blocks 603 are no longer needed.

Figure 7:
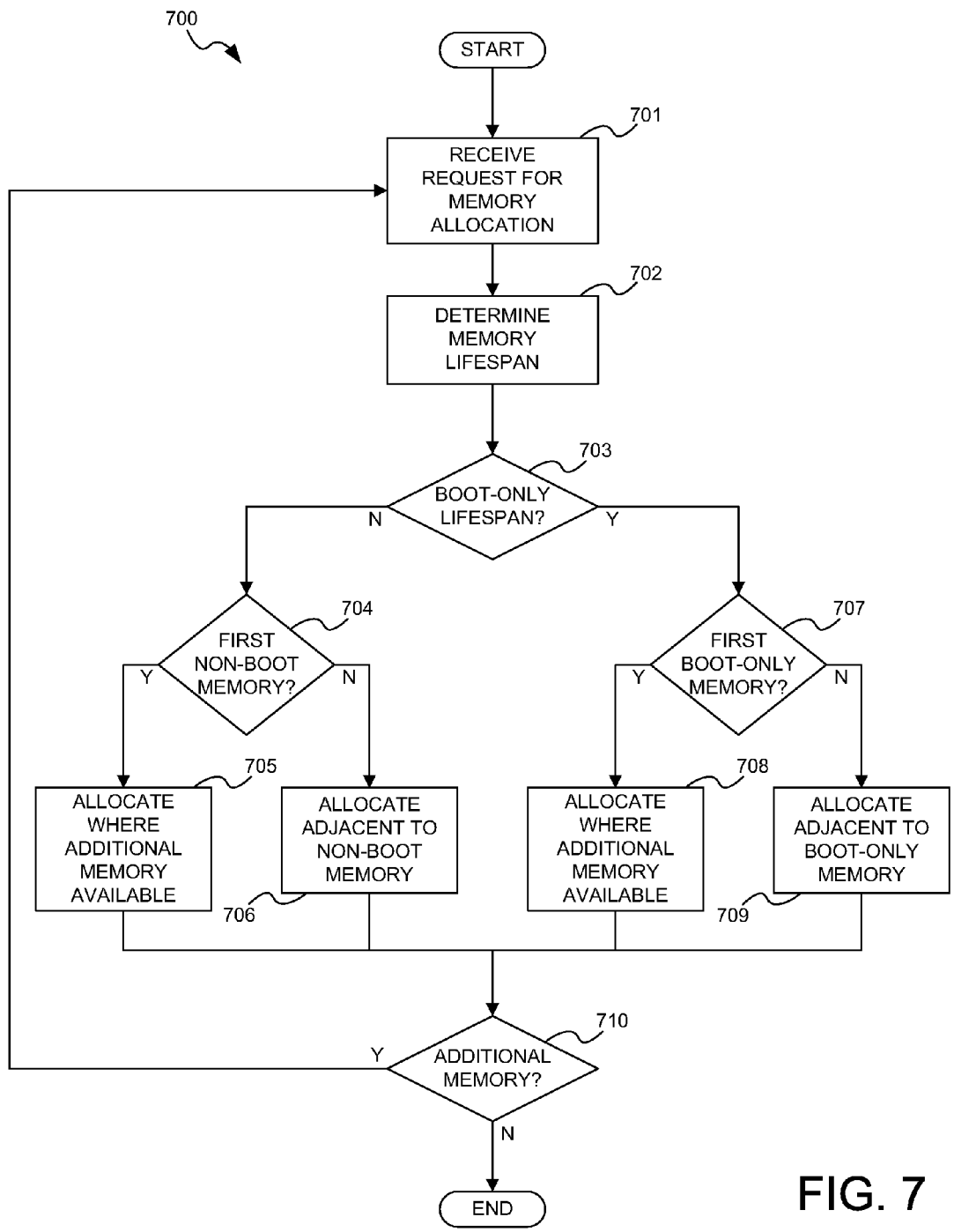
FIG. 7 is a flow diagram illustrating a process for providing efficient firmware memory management according to embodiments.

FIG. 7 is a flow diagram illustrating an example of a process for efficient firmware memory management. The logical operations of the various implementations presented, including those of FIG. 7 may be (1) a sequence of computer implemented acts or program modules running on computer 100 and/or (2) interconnected machine logic circuits or circuit modules within computer 100. The implementation is a matter of choice dependent on the performance requirements of the computer on which the embodiments are implemented. Accordingly, the logical operations making up the implementations are referred to variously as operations, structural devices, acts, or modules. It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

Routine 700 begins with operation 701, which involves a memory manager receiving a request for an allocation of a block of memory. The request may be received from EFI boot loader 312, or from another piece of executing code requiring additional memory. Once received, at operation 702, the boot loader 312 determines the lifespan of the memory, determining whether the block is only needed for boot time, or needed at run time for use by, for example, an operating system 202. This determination may be made based on a memory type parameter associated with the request. In an EFI environment, for example, the EFI_MEMORY_TYPE parameter of the AllocatePages function indicates a type of memory to be allocated, and the type can be used to determine a lifespan for the allocation. For example, EFI boot loader 312 may consult a table or list to determine which modules to load, making requests of a memory manager for each module or group of modules. The table or list may include information designating a type of memory which is then passed as a parameter with the request. At decision 703, if the block of memory has a memory type indicating that it is non-boot-only, then at decision 704, the boot loader 312 checks if the block is the first non-boot-only block requested. If so, at operation 705, the boot loader 312 allocates the block at a first location which allows for other non-boot-only blocks to be allocated adjacent. For example, the memory manager may locate the first non-boot-only block at the top of the memory, in the highest available address. If at decision 704, the block of memory is not the first non-boot-only block allocated, then the block is allocated adjacent to the other already-allocated non-boot-only modules at operation 706.

Returning to decision 703, if the firmware module is needed only at boot time, then at decision 707, the allocation is checked to see if it is the first boot-only block to be allocated. At operation 708, if the module is the first boot-only block of memory to be allocated, then it may be loaded into a location that will leave sufficient space for subsequent boot-only memory blocks to be allocated. If the block is not the first boot-only block to be allocated, then it may be located adjacent to other previously allocated boot-only blocks. It should be noted that boot-only blocks do not necessarily need to be located adjacent to each other, so long as they do not prevent non-boot-only blocks from being located adjacent to each other. Once the block of memory is allocated, the memory manager checks for any additional memory allocation requests. If there are any, then process 700 begins again with the next request. If not, the process terminates normally.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for efficient firmware memory allocation, the method comprising:
  receiving a firmware memory allocation request for an allocation of memory;
  determining whether a lifespan associated with the allocation falls within a lifespan limit; and
  responding to the firmware memory allocation request when the lifespan falls within the lifespan limit by allocating available memory in a first portion of memory having only memory allocations falling within the lifespan limit.

2. The method of claim 1, further comprising responding to the firmware memory allocation request when the lifespan falls outside the lifespan limit by allocating available memory in a second portion of memory having only memory allocations falling outside the lifespan limit.

3. The method of claim 2, wherein determining that the lifespan associated with the allocation falls within a lifespan limit comprises determining that the allocation has a lifespan not exceeding a boot time.

4. The method of claim 3, wherein determining that a lifespan associated with the allocation falls outside a lifespan limit comprises determining that the allocation has a lifespan exceeding the boot time.

5. The method of claim 2, wherein responding to the firmware memory allocation request when the lifespan falls within the lifespan limit by allocating available memory in the first portion comprises:
  determining whether the allocation is a first allocation in the first portion; and
  responding to the firmware memory allocation request when the allocation is not the first allocation in the first portion by allocating memory that is adjacent to a previous allocation in the first portion.

6. The method of claim 5, wherein responding to the firmware memory allocation request when the lifespan falls outside the lifespan limit by allocating available memory in the second portion comprises:
  determining whether the allocation is a first allocation in the second portion; and
  responding to the allocation firmware memory allocation request when the allocation is not the first allocation in the second portion by allocating memory that is adjacent to a previous allocation in the second portion.

7. The method of claim 6, wherein allocating memory that is adjacent to a previous allocation in the first portion comprises allocating memory at a higher address than an address of the previous allocation in the first portion, and wherein allocating memory that is adjacent to a previous allocation in the second portion comprises allocating memory at a lower address than an address of the previous allocation in the second portion.

8. The method of claim 6, wherein allocating memory that is adjacent to a previous allocation in the first portion comprises allocating memory at a lower address than an address of the previous allocation in the first portion, and wherein allocating memory that is adjacent to a previous allocation in the second portion comprises allocating memory at a higher address than an address of the previous allocation in the second portion.

9. The method of claim 2, further comprising:
  allocating a plurality of adjacent memory locations in the first portion in response to a plurality of firmware memory allocation requests;
  receiving a first memory allocation information request; and
  responding to the first memory allocation information request by providing a single entry encompassing the plurality of adjacent memory locations in the first portion and an available status.

10. The method of claim 9, further comprising:
  allocating a plurality of adjacent memory locations in the second portion in response to a plurality of firmware memory allocation requests;
  receiving a second memory allocation information request; and
  responding to the second memory allocation information request by providing a single entry encompassing the plurality of adjacent memory locations in the second portion and an unavailable status.

11. A computer-readable medium having computer storage instructions stored thereon which, when executed by a computer, cause the computer to perform the method of claim 1.

12. A computer-controlled apparatus capable of performing the method of claim 1.

13. A computer-readable medium having computer storage instructions stored thereon for allocating memory to a firmware, the computer-executable instructions comprising:
  receiving a request to allocate memory for a first block of memory;

determining that a first lifespan for the first block of memory does not exceed a lifespan limit; and locating the first block of memory in a memory adjacent to a second block of memory already allocated and having a second lifespan not exceeding the lifespan limit.

14. The computer-readable medium of claim 13, wherein the computer storage instructions stored thereon further comprise:

receiving a request to allocate memory for a third block of memory;

determining that a third lifespan for the third block of memory exceeds the lifespan limit;

locating the third block of memory in the memory adjacent to a fourth block of memory already allocated and having a fourth lifespan exceeding the lifespan limit.

15. The computer storage medium of claim 13, wherein the lifespan limit coincides with a point at which an operating system begins executing.

16. The computer storage medium of claim 13, wherein the instructions are all executed prior to the execution of an operating system.

17. A system for recovering a firmware for a computer, the system comprising:

a processor; and a non-volatile memory, in communication with the processor, the memory storing instructions executable by the processor which, when executed, are operative to:

receive a plurality of memory allocation requests for allocation into a volatile memory; and for each one of the plurality of memory allocation requests, determine whether a block of memory of the one of the memory allocation requests is needed only for boot time;

if the block of memory is not needed only for boot time, allocating the block of memory in a first region of the volatile memory intended for blocks of memory not needed only for boot time; and if the block of memory is needed only for boot time, allocating the block of memory in a second region of the volatile memory intended for blocks of memory needed only for boot time.

18. The system of claim 17, wherein the instructions are further operative to allocate the block of memory in the first region such that all blocks of memory in the first region are adjacent to each other in the volatile memory.

19. The system of claim 18, wherein the instructions are further operative to allocate the block of memory in the second region such that all blocks of memory in the second region are adjacent to each other in the volatile memory.

20. The system of claim 17, wherein the instructions are operative to execute prior to the execution of an operating system.

* * * * *

UNITED STATES PATENT AND TRADEMARK OFFICE
CERTIFICATE OF CORRECTION

PATENT NO. : 7,577,814 B1 Page 1 of 2
APPLICATION NO. : 11/618003
DATED : August 18, 2009
INVENTOR(S) : Sergiy B. Yakovlev It is certified that error appears in the above-identified patent and that said Letters Patent is hereby corrected as shown below:

On the Title Page, Item (74) Attorney, Agent or Firm – should read as follows: Hope Baldauff Hartman, LLC Claim 11, at column 10, lines 58-60. At column 10, line 58, delete "-readable" before "medium" and insert --storage-- therefor, and delete "storage" before "instructions" (on line 59) and insert -- -executable--. Corrected claim 11 should read as follows:

11. A computer storage medium having computer-executable instructions stored thereon which, when executed by a computer, cause the computer to perform the method of claim 1.

Claim 13, at column 10, lines 63-67 and at column 11, lines 1-5. At column 10, line 63, delete "-readable" before "medium" and insert --storage-- therefor, and delete "storage" before "instructions" (on line 64) and insert -- -executable--. Corrected claim 13 should read as follows:

13. A computer storage medium having computer-executable instructions stored thereon for allocating memory to a firmware, the computer-executable instructions comprising:

receiving a request to allocate memory for a first block of memory;

determining that a first lifespan for the first block of memory does not exceed a lifespan limit; and Signed and Sealed this Twelfth Day of October, 2010

David J. Kappos
*Director of the United States Patent and Trademark Office* locating the first block of memory in a memory adjacent to a second block of memory already allocated and having a second lifespan not exceeding the lifespan limit.

Claim 14, at column 11, lines 6-15. At column 11, line 6, delete "-readable" before "medium" and insert --storage-- therefor, and at line 7 delete "storage" before "instructions" and insert -- -executable--. Corrected claim 14 should read as follows:

14. The computer storage medium of claim 13, wherein the computer-executable instructions stored thereon further comprise:

receiving a request to allocate memory for a third block of memory;

determining that a third lifespan for the third block of memory exceeds the lifespan limit;

locating the third block of memory in the memory adjacent to a fourth block of memory already allocated and having a fourth lifespan exceeding the lifespan limit.